United States Patent [19]

Ollis, Jr. et al.

[11] 3,982,575

[45] Sept. 28, 1976

[54] THREAD FORMING SELF-LOCKING SCREW

[75] Inventors: Raymond Ollis, Jr., Oakville, Canada; William J. Thomas, Glenside, Pa.

[73] Assignee: Standard Pressed Steel Co., Jenkintown, Pa.

[22] Filed: Dec. 23, 1974

[21] Appl. No.: 535,393

[52] U.S. Cl. .................................... 151/22
[51] Int. Cl.² .................................... F16B 39/30
[58] Field of Search .......... 151/22, 70, 14 R; 85/1 SS, 46, 48

[56] References Cited
UNITED STATES PATENTS

| | | | |
|---|---|---|---|
| 2,314,274 | 3/1943 | Hallowell | 151/70 |
| 2,691,538 | 10/1954 | Clausen | 151/70 |
| 3,186,464 | 6/1965 | Baumle | 151/22 |
| 3,339,389 | 9/1967 | Mosow | 151/22 |
| 3,426,642 | 2/1969 | Phipard | 151/22 |
| 3,481,380 | 12/1969 | Breed | 151/22 |

FOREIGN PATENTS OR APPLICATIONS

| | | | |
|---|---|---|---|
| 71,848 | 11/1893 | Germany | 151/22 |
| 1,115,533 | 10/1961 | Germany | 151/22 |

*Primary Examiner*—Ramon S. Britts
*Attorney, Agent, or Firm*—Andrew L. Ney; Aaron Nerenberg

[57] ABSTRACT

A thread forming and vibration resistant fastener having a shank with at least a portion of its length provided with an external thread. At least a portion of the thread has an irregular surface configuration on both of its flanks in the form of a plurality of serrations. The serrations are shaped as teeth, when viewed along a cylinder concentric with the longitudinal axis of the fastener, with the teeth extending inwardly from adjacent the crest of the thread portion to a termination inwardly of the pitch diameter thereof.

19 Claims, 6 Drawing Figures

U.S. Patent  Sept. 28, 1976  3,982,575
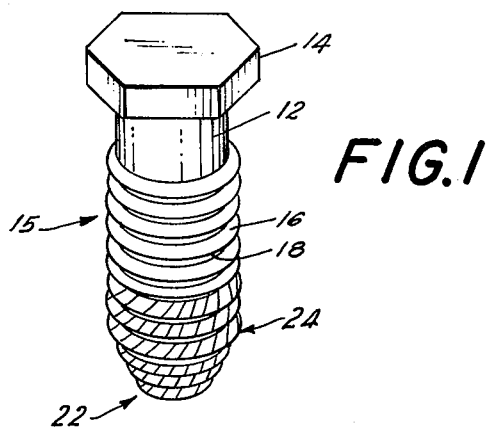
FIG.1
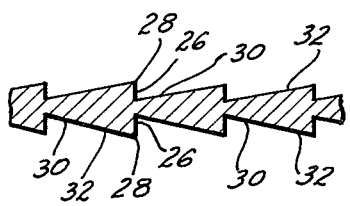
FIG.5
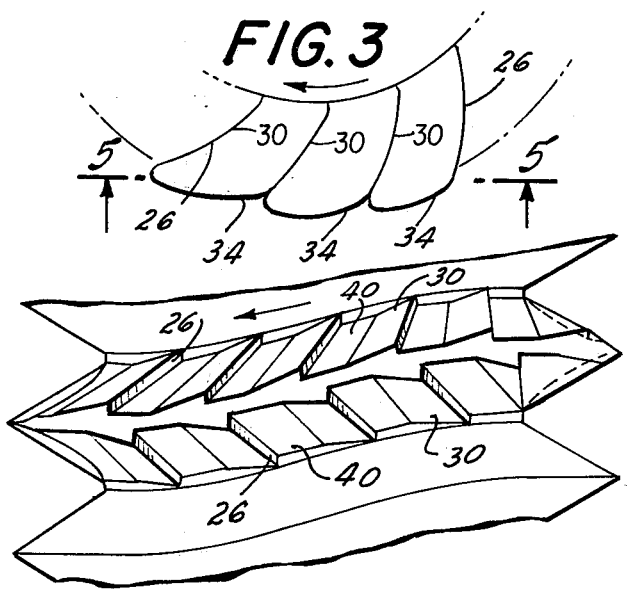
FIG.2
FIG.3
FIG.4
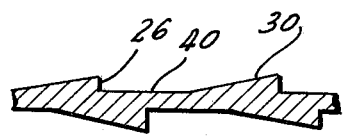
FIG.6

THREAD FORMING SELF-LOCKING SCREW

The present invention relates to thread forming fasteners, and more particularly to a thread forming fastener which also has vibration resistant characteristics.

In numerous applications in which threaded fasteners are utilized, it is desirable that the fastener itself form a complimentary thread in the workpiece in which the fastener is inserted, and numerous types of self-threading screws and bolts have been previously proposed in the art. It is apparent that where self-threading screws or bolts are utilized, for example in a prebored workpiece, a substantial amount of torque is required to be applied to the fastener in order to overcome the drag torque on the threads of the fastener as it is rotated into the unthreaded bore. While it is desirable to reduce the torque required to form the threads with self-threading fasteners, it is simultaneously desired, in many applications, that a tight engagement be maintained between the threads of the fastener and the threads formed in the workpiece by maintaining a tight frictional grip therebetween to secure the fastener to the workpiece or to secure two workpieces together. This is particularly important where the workpieces secured by the fastener are subjected to vibrations, so that the screw or fastener must not be permitted to loosen or permit the workpieces to move relative to one another.

Accordingly, it is an object of the present invention to provide a threaded fastener which is adapted to form a thread in a workpiece while simultaneously providing improved rotation resistant properties when installed in a workpiece.

A further object of the present invention is to provide an improved thread forming fastener having rotation resistant properties which may be readily and economically manufactured.

A still further object of the present invention is to provide a thread forming fastener which can be inserted in an unthreaded workpiece with a minimum of torque while providing improved rotation resistant properties, and which may be repeatedly engaged and disengaged from the workpiece in which it is employed without marked deterioration in the rotation resistant properties of the fastener.

In accordance with a preferred embodiment of the present invention, a thread forming fastener is provided which includes a threaded shank having at least one thread portion having an irregular surface configuration formed on both of its flanks. This irregular surface configuration comprises a plurality of serrations in the form of teeth when viewed along a cylinder concentric with the longitudinal axis of the fastener, with the teeth extending inwardly from adjacent the crest of the thread to a termination inwardly of the pitch diameter. Each of the teeth, on opposite flanks of the thread, include an inclined ramp which extends from a root portion to a crest portion with a buttress extending from the crest portion of the tooth towards the flank of the thread portion on which it is formed. The teeth thus formed on the thread of the shank serve to form a complimentary thread in the workpiece in which the fastener is inserted, while the buttresses of these teeth resist the tendency of the threaded fastener to rotate in the opposite direction and back off when subjected to vibrations.

The above, and other objects, features and advantages of the present invention, will be apparent in the following detailed description of illustrative embodiments thereof which are to be read in connection with the accompanying drawing, wherein:

FIG. 1 is a perspective view of a threaded fastener formed in accordance with one embodiment of the present invention;

FIG. 2 is an enlarged partial elevational view of a thread portion of the fastener shown in FIG. 1, having an irregular surface configuration in accordance with one embodiment of the present invention;

FIG. 3 is a partial plan view of one flank of a thread portion of the embodiment of the invention shown in FIG. 2, taken along lines 3—3 of FIG. 2;

FIG. 4 is a partial elevational view, similar to FIG. 2, of another embodiment of the present invention;

FIG. 5 is an enlarged developed edge view of a portion of the crest of the thread shown in FIG. 3, and taken along line 5—5 in FIG. 3; and FIG. 6 is an enlarged developed edge view, similar to FIG. 5, of the thread shown in FIG. 4.

Referring now to the drawings in detail, and initially to FIG. 1 thereof, a threaded fastener, constructed in accordance with one embodiment of the present invention, is illustrated which includes a shank portion 12 and a head 14 of conventional construction adapted to be engaged by a wrenching tool to permit the fastener to be rotated into engagement with an unthreaded bore in a workpiece. The shank 12 includes a standard thread configuration 15, formed in a thread rolling operation similar to that described in copending U.S. patent Application Ser. No. 470,873 filed May 17, 1974, now U.S. Pat. No. 3,849,760, commonly assigned herewith, the disclosure of which is incorporated herein by reference.

Thread 15 is defined by a pair of angularly related helical flanks 16, 18. The thread commences, in the conventional manner, at the lower tapered point end 22 of fastener shank 12, and expands in a spiral manner outwardly to the maximum thread diameter after a number of revolutions of the thread, with the thread having a relatively constant diameter above the lower tapered portion of the shank. The fastener shank and thread is tapered in this manner to allow insertion of the lower end of the fastener in an unthreaded bore in a workpiece in order to initiate the formation of threads in the unthreaded bore of the workpiece upon rotation of the fastener.

The lead-in portion 22 of the fastener is provided with an irregular serrated configuration on both of its flanks 16, 18 (FIG. 2) around the circumference of the thread. As will become more clear below, the irregular serrated configuration on both thread flanks results in the development of an edge effect generally along the crest of the thread which is capable of forming a complimentary internal thread in an unthreaded bore of a workpiece, and also results in the development of a rotation resistant characteristic in the screw. The serrated configuration is carried to at least the lowermost thread 24 of maximum diameter on shank 12 and, if desired, this irregular serrated configuration can be provided along an even greater length of shank 12, even to the underside of head 14. The extent of the serrated configuration is dependent upon the desired rotation resistant characteristic of the screw.

When the serrations on the flanks 16, 18, of thread 24 (or any other thread on which they are formed) are viewed along a cylinder concentric with the longitudinal axis of the screw, the serrations are seen to be in the form of teeth. These teeth are generally saw-tooth in shape and each includes a vertical wall or buttress 26 extending between the crest 28 of a given tooth and a root 30 of an adjacent tooth. An inclined surface or ramp 32 extends between the crest 28 and the root 30 of the tooth. This ramp is preferably inclined with respect to a plane parallel to the helix angle of the thread formation of the fastener at an angle of between 5° and 25°. In the embodiment of the invention illustrated in FIGS. 2 and 5, the buttresses 26 of each tooth on the flanks 16, 18 of a given thread are located in vertical alignment with each other, thereby to form a relatively uniform serrated configuration along the thread spiral.

As seen more clearly in FIG. 3, the buttresses 26 of the teeth are skewed with respect to the radial center of the fastener 12 with the skew angle being in the range of 15° to 35° with respect to the radius taken from the radial center of the fastener to the crest of the thread. This orientation of the crest and buttress of each tooth increases the surface area of the buttress over a radial orientation of the crest and buttress, whereby increased resistance to rotational movement of the fastener after it is secured in place is achieved. By providing an arcuate path (as shown by the dashed lines in FIG. 3) from the innermost portion of each buttress (at the root of the thread) to the outermost portion (at the crest of the thread), a slightly greater surface area is developed over the equivalent path than if the buttresses were formed as straight planes. This results in a corresponding slight increase in resistance against rotational movement of the fastener after it is secured in place.

The ramp 32 of each serration or tooth is inclined in the direction of rotation of the fastener when it is rotated towards its engaging position, i.e., clockwise for a right handed thread. Thus, during rotation of the screw into engagement with the unthreaded bore in a workpiece, the serrations serve in forming a thread in the bore of the workpiece, while the buttresses thereof provide no substantial frictional resistance to the rotational engagement of the fastener in the workpiece.

When turning the fastener 10 into the workpiece the serrations or teeth on the thread provide an interrupted contact between the previously unthreaded bore in the workpiece and the external threads of the fastener which impress their shape on the bore. This interrupted contact tends to reduce the driving force required to generate the internal thread in the workpiece. In addition, this desirable interrupted contact between the fastener threads and the previously unthreaded bore is also provided along the crest of the thread forming thread in the fastener, by the provision of serrations on both flanks of thread, since the formation of the teeth on the thread will cause extensions 34 to be formed along the crest of the serrated thread. These extensions are the result of metal flow during the process of forming the serrations on the fastener shank 12. That is, when the shank 12 is rolled between a pair of dies which have been appropriately constructed to form the serrations in the thread, the metal in the shank will flow in the die in order to produce a constant volume of material throughout the thread cross-section. Thus, as the thickness of the thread is decreased at the front or root of each tooth, the displaced material will be forced outwardly of the tooth to a larger diameter. Accordingly, it will be apparent that the serrated threads of fastener 12 will have a larger virtual pitch diameter and a larger diameter than any unserrated threads thereabove. Thus, when fastener 10 is rotated into the unthreaded bore of the workpiece, the extensions 34 of the teeth or serrations will swage a deeper thread therein, with the advantageous interrupted contact therebetween reducing the torque drag required for the swaging to occur. The crests of any unserrated threads which follow will then not engage the roots of the threads formed in the workpiece, so that no drag torque is produced thereby.

The fastener 10 described above can be used in any conventional manner to secure two workpieces together or to function as a set screw. In either case, once the fastener is seated (for example when the end 22 becomes engaged with a second workpiece when the fastener functions as a set screw), continual application of a seating torque forces the load bearing flank of each of the threads of the fastener into more intimate contact with a mating thread flank in the now internally threaded receiving bore of the workpiece in which the fastener was inserted. This compressive force between the load bearing flanks of the mating thread forms results in a substantially elastic deformation of the load bearing flank of the internal thread configuration in the workpiece so that, in essence, the ramp 32 of each serration is depressed into the mating load bearing flank of the internally threaded workpiece, with the result that there is a slight overlapping of the material from the workpiece against the buttress 26. This slight deformation (as described in detail in the above identified application) in the internal thread configuration of the workpiece as it abuts against the buttress of the serrations opposes rotation of the fastener in the opposite direction which would tend to loosen the fastener or back it off from engagement with the workpiece.

In this connection it is noted that the threads of the fastener above thread 24 may be serrated on both flanks, left unaltered, or serrated only on the load bearing flank. The particular application of the screw will dictate the treatment of the threads above thread 24. Serrating the thread portion above thread 24 on only the load bearing flank will not increase the drag torque on the fastener while it is inserted in the workpiece, since the double serrated thread 24 will have formed threads in the workpiece which are slightly larger than the threads having only the load bearing flank serrated. However, once the fastener is subjected to load, the serrations on all of the load bearing flanks of the fastener will be engaged with the mating thread formed in the workpiece.

While the depression formed in the internal thread configuration of the workpiece by the respective teeth on a load bearing flank of the fastener is relatively slight, so that an appropriate off-torque can be applied to loosen the fastener, the locking action provided by the multiplicity of serrations affords sufficient anti-rotation resistance to effectively oppose the fastener backing off when the workpiece is subjected to vibration. Because the individual deformation adjacent each buttress 26 is essentially elastic in nature, no appreciable damage or distortion results through the thread configuration on either the fastener or the mating internal thread configuration of the workpiece in which it is engaged.

Another embodiment for the double serrated thread portion of fastener 10 is illustrated in FIGS. 4 and 6 of the drawing. In this embodiment, the individual teeth are spaced from each other so that the root portion 30 of an individual tooth is separated from the buttress 26 of an adjacent tooth by a flat portion 40 of the flank on which the teeth are formed. This arrangement reduces the number of teeth along the serrated portion of the thread, thereby further reducing the drag torque induced by the serrations on the unthreaded bore of the workpiece. The formation of the teeth on opposite flanks of the thread, however, will also produce the extensions 34 previously described to provide the interrupted contact at the crest of the thread. However, it will be apparent that the extensions will also be spaced from each other along the crest of the thread corresponding to the flat portion 40 of the flank between the teeth.

In this embodiment of the invention the teeth on opposite flanks of an individual thread can be formed so that their buttresses 26 are in alignment with each other, as was the case in the embodiment of FIGS. 3 and 5, or the teeth can be formed so that they are staggered with respect to one another on the opposite flanks of the thread. Thus, as illustrated in FIG. 6, the buttress 26 of a tooth on the flank 16 will be staggered with respect to the buttress 26 of a tooth therebelow on the flank 18. It is believed that such an arrangement will further reduce the drag torque on the fastener during the thread forming operation.

As mentioned, the serrated configuration on the flanks 16, 18 of the threads of fastener 10 can be provided on only the lowermost portion of the fastener, or along a desired length up the shank 12. Alternatively, these double serrated thread portions can be provided on alternate threads along the length of the shank. In addition, the shank can be provided with threads having only their load bearing flank serrated, to improve the rotation resistant properties of the fastener after it is set in place.

Accordingly, it will be seen that the present invention provides a fastener which is adapted to form a thread in an unthreaded bore of a workpiece, with the use of a minimum amount of torque while simultaneously providing improved rotation resistant properties. This is effected without deleterious effects which would mar or distort either the thread configuration of the screw itself or the mating thread configuration formed in the workpiece by the screw as it is installed. The reduction in drag torque on the fastener during the thread forming insertion thereof is a result of the interrupted contact provided between the teeth on the double serrated threads as they are rotated into the unthreaded bore and also due to the interrupted contact between the extensions 34 which form a slightly enlarged diameter internal thread in the workpiece, so that the following unserrated or partially serrated threads do not contact the complimentary root of the internally formed thread in the workpiece. As a result the drag torque is only produced on the threads on which the double serrations on the flanks 16, 18 are formed.

Although illustrative embodiments of the present invention have been described herein with reference to the accompanying drawings, it will be appreciated that various changes and modifications may be effected therein by one skilled in the art without departing from the scope or spirit of this invention.

We claim:

1. A thread forming fastener for forming generally complementary threads in a workpiece comprising a shank having at least a portion of its length provided with an external thread defined by a pair of thread flanks, at least a portion of said external thread having an irregular surface configuration formed on both of its flanks, said irregular surface configuration comprising a plurality of serrations in the form of teeth when viewed along a cylinder concentric with the longitudinal axis of said fastener, said teeth extending inwardly from adjacent the crest of said thread portion, between the flanks thereof, to a termination inwardly of the pitch diameter thereof, each of said teeth comprising a ramp inclined downwardly in the direction of rotation for engaging the fastener in the workpiece extending from a root portion at the forward end of said ramp with respect to said direction of rotation to a crest portion at the rearward end thereof with an abrupt wall defining a buttress extending from said crest portion to the root portion of an adjacent tooth, and wherein said thread portion has an irregular peripheral configuration comprising extension portions of each of said teeth extending radially beyond the original diameter of the unserrated thread portion crest, each of said extension portions having a maximum diameter adjacent said root portion of their associated teeth; whereby an interrupted contact is provided between said crest portion of each of said teeth and the workpiece as the fastener is turned into the workpiece to produce a complementary thread therein with a minimum of drag torque.

2. A thread forming fastener as defined in claim 1 wherein said buttresses are oriented at a skewed angle relative to the radii of said fastener.

3. A thread forming fastener as defined in claim 1 wherein said portion of said thread having said irregular configuration formed on both of its flanks includes a tapered section extending from the point end of said fastener toward the other end of said fastener.

4. A thread forming fastener as defined in claim 1 wherein said extension portions are tapered from said maximum diameter thereof, to a minimum diameter adjacent said crest portions of their associated teeth.

5. A thread forming fastener as defined in claim 4 wherein said buttresses lie in planes generally parallel to the longitudinal axis of said shank.

6. A thread forming fastener as defined in claim 1 wherein the buttresses of teeth on the opposed flanks of said thread are located in vertical alignment with each other.

7. A thread forming fastener as defined in claim 2 wherein said skewed angle is within the range of about 15° to 35°.

8. A thread forming fastener as defined in claim 1 wherein the inclined ramp of each of said teeth forms an angle of between 5° and 25° with a plane parallel to the helix angle of said thread.

9. A thread forming fastener as defined in claim 1 wherein each of said buttresses is formed to be convolute in shape to define an arcuate path from its inner end to its outermost end.

10. A thread forming fastener as defined in claim 1 wherein said portion of said thread having said irregular configuration formed on both of its flanks extends from the point end of said fastener along a selected length of said shank.

11. A thread forming fastener as defined in claim 10 including another thread portion between said thread portion and the end opposite said point end of said fastener, said another thread portion having said irregular surface configuration on the load bearing flank of said external thread only.

12. A thread forming and vibration resistant fastener for use in a workpiece comprising a shank having at least a portion of its length provided with an external thread defined by a load bearing thread flank and a non-load bearing thread flank, a first portion of said thread having an irregular surface configuration formed on both of said flanks and a second portion of said thread having said irregular surface configuration formed on said load bearing flank only, said irregular surface configuration comprising a plurality of serrations in the form of teeth when viewed along a cylinder concentric with the longitudinal axis of said fastener, said teeth extending inwardly from adjacent the crest of said external thread portion, between the flanks thereof, to a termination inwardly of the pitch diameter thereof, each of said teeth comprising a ramp inclined relatively gently with respect to a plane parallel to the helix angle of said thread in the direction of rotation for engaging the fastener in the workpiece, said ramp extending from a root portion at the forward end of said ramp with respect to said direction of rotation to a crest portion at the rearward end of each of said teeth and a relatively steeply inclined wall defining a buttress with respect to a plane parallel to the longitudinal axis of the fastener, said buttress extending from said crest portion to the root portion of an adjacent tooth, said first thread portion further having an irregular peripheral configuration along the crest thereof, said irregular peripheral configuration comprising extension portions of each of said teeth extending radially beyond the original diameter of the unserrated thread portion crest, each of said extension portions having a maximum diameter adjacent said root portion of their associated teeth and being tapered from the maximum diameter to a minimum diameter adjacent said crest portion of their associated teeth; whereby an interrupted contact is provided between said crest portion of each of said teeth and the workpiece as the fastener is turned into the workpiece to produce a complementary thread therein with a minimum of drag torque, and whereby said teeth on said load-bearing flank, only, cooperate with the mating workpiece thread flanks upon the inducement of a compressive load in said fastener, substantalliy elastically deforming a portion of the mating thread flanks causing a lapping over of the material of the workpiece against said buttresses to preclude back off of said fastener from an engaged, compressively loaded condition.

13. A fastener as defined in claim 12 wherein said buttresses are oriented at a skewed angle relative to the radii of said fastener.

14. A fastener as defined in claim 12 wherein said first portion of said thread includes a tapered section extending from the point end of said fastener toward the other end of said fastener.

15. A fastener as defined in claim 13 wherein said buttresses lie in planes generally parallel to the longitudinal axis of said shank.

16. A fastener as defined in claim 12 wherein the buttresses of teeth on the opposed flanks of said thread are located in vertical alignment with each other.

17. A fastener as defined in claim 13 wherein said skewed angle is within the range of about 15° to 35°.

18. A fastener as defined in claim 12 wherein the inclined ramp of each of said teeth forms an angle of between 5° and 25° with a plane parallel to the helix angle of said thread.

19. A fastener as defined in claim 12 wherein each of said buttresses is formed to be convolute in shape to define an arcuate path from its inner end to its outermost end.

* * * * *